United States Patent [19]

Curtis

[11] Patent Number: 5,437,482
[45] Date of Patent: Aug. 1, 1995

[54] PIPE ADAPTER FLANGE

[76] Inventor: Donald K. Curtis, 20237—149th Pl. NE, Woodinville, Wash. 98072

[21] Appl. No.: 224,310

[22] Filed: Apr. 7, 1994

[51] Int. Cl.⁶ .................................. F16L 23/036
[52] U.S. Cl. .................. 285/174; 285/368; 285/363
[58] Field of Search ............. 285/412, 413, 414, 368, 285/174, 363

[56] References Cited

U.S. PATENT DOCUMENTS

| | | | |
|---|---|---|---|
| 1,292,060 | 1/1919 | Richards | 285/368 X |
| 1,462,698 | 7/1923 | Haughey | 285/412 |
| 3,761,114 | 9/1973 | Blakeley | 285/368 X |
| 4,073,402 | 2/1978 | Wood | 285/368 X |
| 4,288,105 | 9/1981 | Press | 285/368 X |
| 4,372,587 | 2/1983 | Roche | 285/414 X |
| 4,552,386 | 11/1985 | Burchette | 285/414 X |
| 4,610,471 | 9/1986 | Halen et al. | 285/368 X |

FOREIGN PATENT DOCUMENTS

| | | | |
|---|---|---|---|
| 0209826 | 6/1956 | Australia | 285/368 |
| 1016967 | 11/1952 | France | 285/414 |
| 0843439 | 8/1960 | United Kingdom | 285/368 |
| 2073836 | 10/1981 | United Kingdom | 285/174 |

OTHER PUBLICATIONS

Military Standardization Handbook—Plastics MIL-HDBK-700 [MR] Nov. 1, 1965 pp. 43–44.

*Primary Examiner*—Dave W. Arola
*Assistant Examiner*—Heather C. Shackelford
*Attorney, Agent, or Firm*—Harry M. Cross, Jr.

[57] ABSTRACT

A pipe adapter flange coupling system for joining two flanged pipe section ends comprises an adapter ring constructed to be positioned between the flanged pipe section ends, a first set of bolts for clamping one flanged pipe section end to one side of the adapter ring, and a second set of bolts for clamping another flanged pipe section end to another side of the adapter ring. The pipe adapter flanged coupling system adapter ring is generally circular and has inner and outer circles of threaded bolt holes. The first set of bolts extending through a compression ring constructed to bear against one flanged pipe section and threadable into the outer ring of bolt holes in the adapter ring. The second set of bolts extendable through another pipe section end and threadable into the inner ring of bolt holes in the adapter ring.

2 Claims, 2 Drawing Sheets

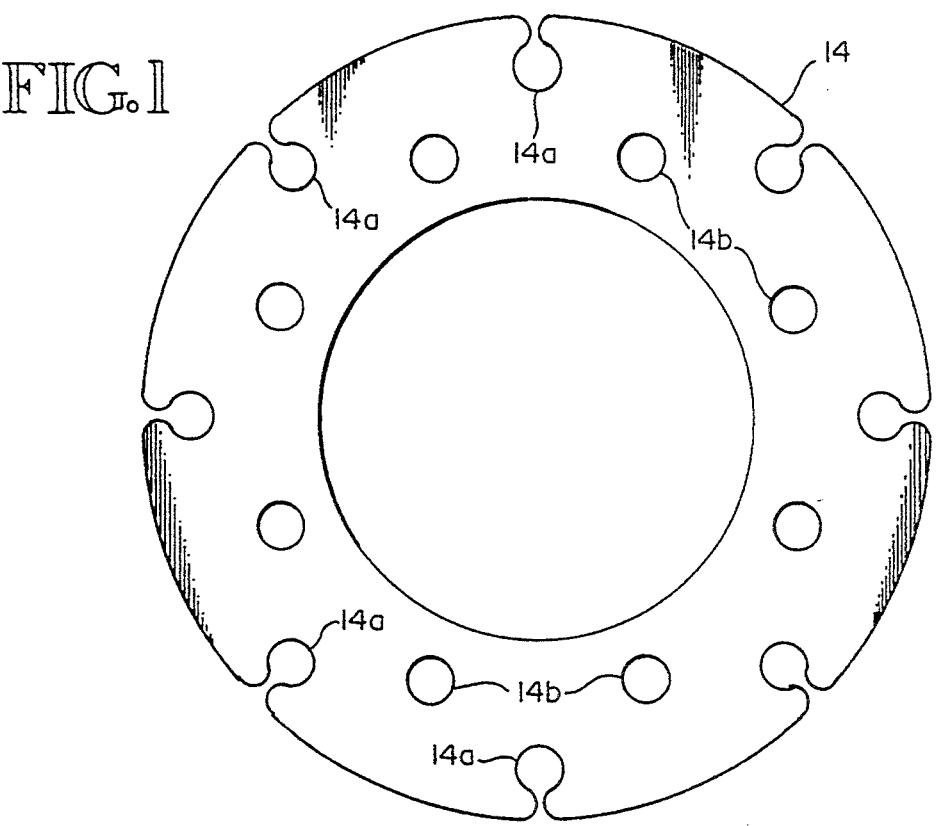
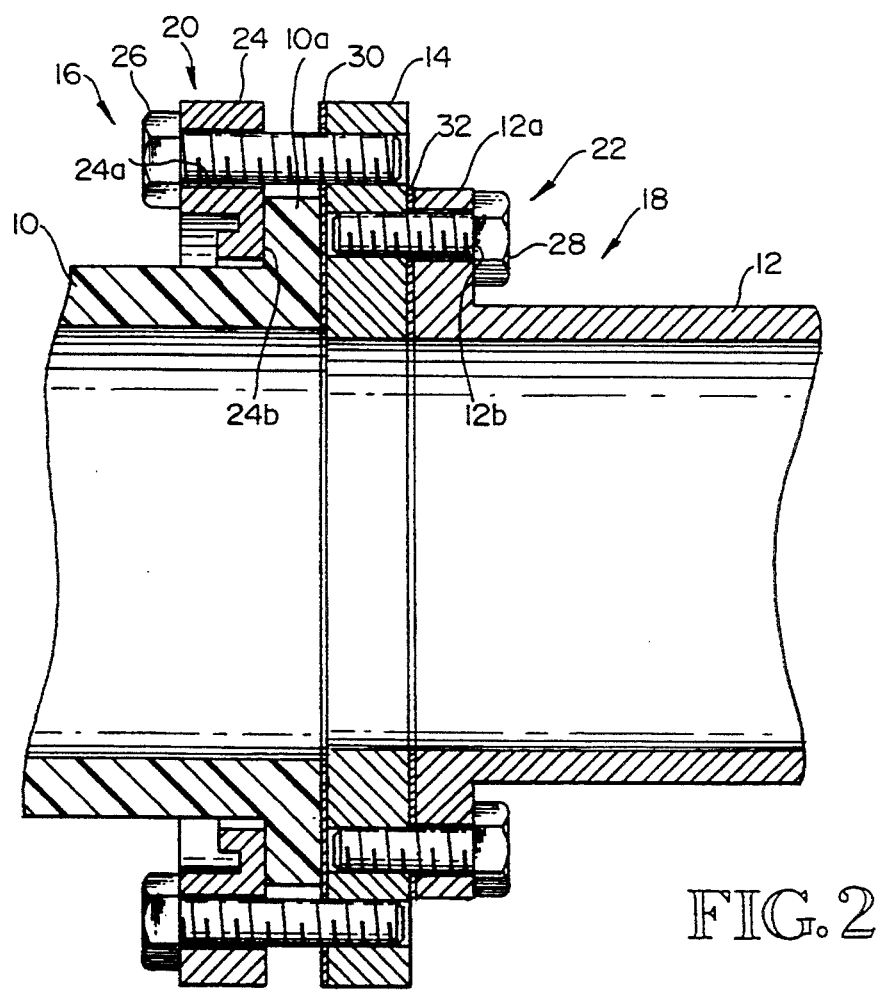

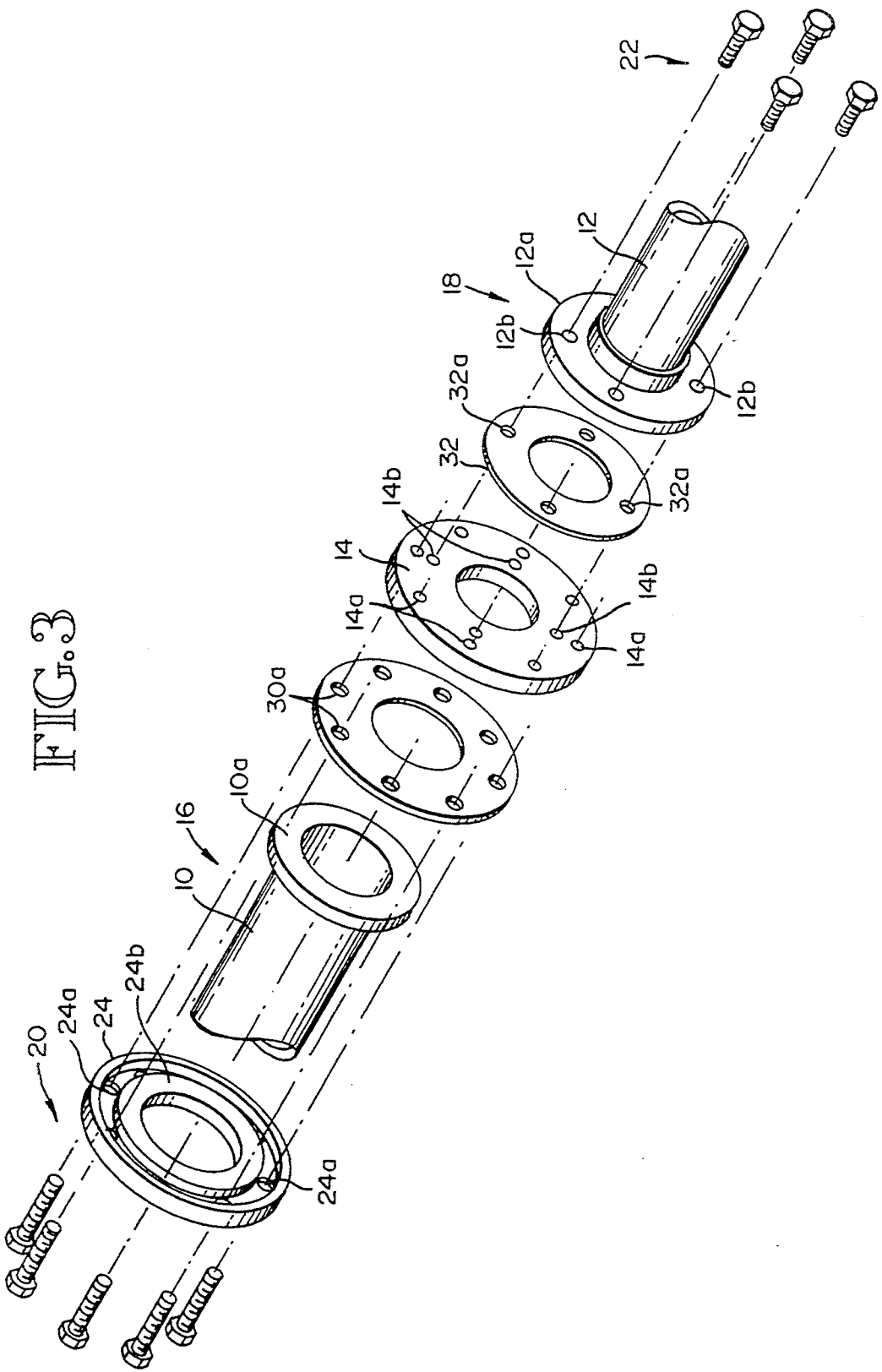

PIPE ADAPTER FLANGE

FIELD OF THE INVENTION

This invention relates to pipe adapters for joining pipes of different sizes. More particularly, this invention relates to adapters for joining high-density polyethylene pipe to ductile iron, P.V.C. or steel pipes, or pipe sections, or to other I.D.-controlled pipes.

BACKGROUND OF THE INVENTION

By custom and convention, high-density polyethylene pipe is O.D.-controlled. That is to say, the capacity of high-density polyethylene pipe is specified by its outer diameter. However, ductile iron, P.V.C. and steel pipe is I.D.-controlled; their capacities are specified by their inner diameters. Heretofore, there was no convenient means for reliably joining high-density polyethylene pipe to these other pipes.

To illustrate the difficulty, for a given capacity requiring a 12 inch ductile iron pipe, the 12 inch ductile iron pipe would have a 12 inch nominal O.D. and a 12.58 inch I.D. but a comparable high-density polyethylene pipe would have a nominal O.D. of 16 inches and an I.D. of 12.444 inches. In order for high-density polyethylene pipe to be used to join with ductile iron, P.V.C. or steel pipe, some form of adapter must be employed.

SUMMARY OF THE INVENTION

It is a primary object of this invention to provide an adapter flange system for use in joining O.D.-controlled pipe, such as high-density polyethylene pipe to I.D.-controlled pipe, such as ductile iron, P.V.C., or steel pipe. More generally it is an object of this invention to provide an adapter flange system for use in joining pipes of different sizes. The system of this invention is designed to adapt and join two flanged sections together.

In brief, this invention comprises a pipe adapter flange coupling system for joining two flanged pipe section ends. The system comprises an adapter ring constructed to be positioned between the flanged pipe section ends, first clamping means for clamping one flanged pipe section end to one side of the adapter ring, and second clamping means for clamping another flanged pipe section end to another side of the adapter ring. The pipe adapter flange coupling system adapter ring is generally circular and has inner and outer circles of bolt holes, at least the inner of which is threaded. The first clamping means includes a compression ring constructed to bear against one flanged pipe section end, a plurality or threaded bolts extendable through the compression ring and into the outer ring of bolt holes in the adapter ring. (These bolts are either threaded into the bolt holes or extended through the bolt holes and capped with threaded nuts, depending on the configuration of the adapter ring, whereby the flanged pipe section end may be clamped to the one side of the adapter ring.) The second clamping means comprises a plurality of threaded bolts extendable through another pipe section end and threadable into the inner ring of blot holes in the adapter ring whereby the other flanged pipe section end may be clamped to the other side of the adapter ring.

BRIEF DESCRIPTION OF THE DRAWINGS

FIG. 1 is a plan view of an adapter ring used in the system of the present invention;

FIG. 2 is a cross-section view of the adapter flange system of this invention used to join a polyethylene pipe section to a ductile iron pipe section; and FIG. 3 is a an exploded view of the FIG. 2 assembly illustrating the relative sizes and arrangement of the adapter flange system.

DETAILED DESCRIPTION OF THE INVENTION

When joining pipe sections of different specifications, such as high-density polyethylene pipe 10 to ductile iron pipe 12, the adjacent pipe section ends will be provided with integral flanges, such as at 10a and 12a, respectively. These adjacent pipe section ends could actually be flanged pipe ends, or they could be the flanged end of valve body and a flanged pipe end, or the flanged end of a coupling such as an elbow or tee, and a flanged pipe end. In other words, the adjacent flanged pipe ends can be associated with any device commonly used in a piping system, the important feature required of the pipe end being an integral flange, such as 10a or 12a. The required integral flange may actually be cast or molded into the pipe end during fabrication of the pipe section or it may be added to the pipe section and permanently secured thereto as by bonding or welding. Hereinafter, these are termed "flanged pipe section ends" and this term in intended to encompass the above examples as well as any other equivalent examples.

As shown in the Figures, the pipe adapter flange coupling system of this invention comprises an adapter ring 14 that is located between the two flanged pipe section ends 16 and 18, clamping means 20 to clamp one of the flanged pipe section ends, i.e. 16, to one side of the adapter ring 14, and clamping means 22 to clamp the other of the flanged pipe section ends, i.e. 18, to the opposite side of the adapter ring 14. In the preferred form of the invention as depicted in the drawings, the high-density polyethylene pipe end section 10 and its flange 10a will be larger than the ductile iron pipe end section 12 and its flange 12a. In the case of the high-density polyethylene pipe end section, clamping means 20 comprises a compression ring 24 and a plurality of fasteners 26. Compression ring 24 is designed to slip over the polyethylene flanged pipe section end to clamp that end between the adapter ring 14 and the compression ring 24. The plurality of fasteners 26 clamp pipe flange 10a to adapter ring 14. In the case of the ductile iron pipe end section, clamping means 22 comprises a plurality of fasteners 28 that clamp pipe flange 12a to adapter ring 14.

Fasteners 26 are preferably provided as threaded steel bolts that are inserted through bolt holes 24a in compression ring 24 and are threaded into threaded holes 14a in adapter ring 14. Threaded holes 14a are positioned as an outer circle of holes as shown in FIG. 3. Fasteners 28 are preferably provided as threaded steel bolts that are inserted through bolt holes 12b in pipe end section flange 12a and are threaded into threaded holes 14b in adapter ring 14. Threaded holes 14b are positioned as in inner circle of holes as shown in FIG. 3.

Compression ring 24 and adapter ring 14 are fabricated from a hard, durable material such as steel. Since the ductile iron pipe flange 12a is also fabricated of ductile iron, no compression ring comparable to compression ring 24 is required. The fasteners 28 may be applied directly to the iron flange 12a without the intermediary of a compression ring. Should the assembly involve a pipe section fabricated from P.V.C. or like material, clamping means 18 might include a compression ring similar to compression ring 24, so that the bearing force of fasteners 288 would be applied to that compression ring rather than directly to the P.V.C. flange.

Appropriate fluid seals are applied to each side of adapter ring 14, fluid seal ring 30 having a circle of bolt holes 30a matching the outer bolt hole circle in ring 14 and fluid seal ring 32 having a circle of bolt holes 32a matching the inner bolt hole circle in ring 14.

Adapter ring 14 is provided with an inner diameter that is about the same size of the inner diameter of the smaller of the two adjacent pipe end sections, that of ductile iron pipe section 12 in the case of the embodiment shown in the Figures. The outer diameter of adapter ring 14 is great enough to accommodate the outer ring of bolt holes. Consequently, for a given range of pipe specifications, a variety of adapter ring sizes would be provided, each adapter ring having an inner and outer diameter tailored to match a given pipe specification. Adapter ring 14 and its associated fluid seals, 30, 32, are the only elements of the system that intervene between the flanged sections to be joined or coupled together. The thickness of the adapter ring need only be sufficient to hold the fasteners and to provide the necessary rigidity to insure an appropriate seal between the two flanged sections. The function of adapter ring 14 is not that of a sealing gasket; rather its function is to provide a simple and compact means of joining two differing-sized flanged sections. It is in effect an anchor to which the two flanged coupling means 16, 18 are secured.

Compression ring 24 is provided with an inner annular face 24b having an inner diameter only sightly larger than the outer diameter of the pipe section that it encircles. Annular face 24b has a radial width sufficient to bear against pipe end flange 10a to transfer the clamping load of fasteners 26 to flange 10a so as to seal flange 10a against the immediately adjacent seal ring 30a. The ring of bolt holes 24a lays radially outward from the annular face 24b.

The pipe adapter flange assembly of this invention is compact and does not require much space between the flanged pipe section ends. For pipe nominal sizes ranging between 4 inches and 54 inches, the thickness of adapter ring 14 would typically vary between 0.625 inches to 1.70 inches. In applications where there is enough distance between the outer and inner circle of bolt holes 14a, 14b, the outer circle of bolts holes 14a may be unthreaded, and bolts 26 would be extended completely through the adapter ring 14 and capped with threaded nuts. The adapter ring 14 shown in FIG. 1, with bolt holes 14a open to the periphery, would be suitable for use where the outer circle of bolt holes 14a were unthreaded and the bolts 26 were to be extended completely through the adapter flange. Where the outer circle of bolt holes 14a are threaded, they would be surrounded with material and would appear as shown in FIG. 2 and not as shown in FIG. 1. The outer periphery of the adapter flange shown in FIG. 1 is as it might appear if cast. It is a production option to flame cut the adapter flange from a blank.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. A pipe adapter flange joint for joining two flanged pipe section ends together so that internal fluid passages in said flanged pipe section ends may be joined in fluid communication with one another which comprises:
    a) a first flanged pipe section end having a first flange and a first pipe section to which said first flange is connected, said first pipe section being fabricated of plastic material and having a relatively large outer diameter; a second flanged pipe section end having a second flange and a second pipe section to which said second flange is connected, said second pipe section being fabricated with a smaller outer diameter than said first pipe section, said first flange having a relatively large outer diameter and said second flange having a smaller outer diameter than said first flange;
    b) an adapter ring comprising a disk having first and second sides and being positioned between opposing inner sides of said first and second flanges of said flanged pipe section ends so that a transverse axis of said adapter ring is generally coincident with a longitudinal axis that extends through said flanged pipe section ends, said adapter ring having:
        i) an aperture through said disk in fluid communication with the fluid passages in said flanged pipe section ends, and
        ii) a first outer set of bolt holes extending through said disk, and
        iii) a second inner set of bolt holes extending through said disk, said second inner set of bolt holes being threaded and located radially inward of said first set of bolt holes relative to said transverse axis;
    c) first clamping means for clamping only said first flanged pipe section end to said adapter ring; second clamping means for clamping only said second flanged pipe section end to said adapter ring;
    d) first seal means positioned between said first flange of said first flanged pipe section end and said adapter ring to effect a fluid seal therebetween; and second seal means positioned between said second flange of said second flanged pipe section end and said adapter ring to effect a fluid seal therebetween;
    e) said first clamping means comprising:
        i) a compression ring having outer and inner sides, the inner side of said compression ring being constructed to bear against an outer side of said first flange, and
        ii) a first plurality of bolts extended through said compression ring and into the bolt holes of said first outer set of bolt holes in said adapter ring, said bolts being cooperatively constructed and arranged with respect to said adapter ring for clamping only the inner side of said first flange to said first side of said adapter ring with said first seal means therebetween, so that a fluid seal is effected by said first seal means being contacted by and compressed between the inner side of said first flange and the first side of said adapter ring;
        iii) each of said bolts having bolt heads with said bolts being oriented so that said first flange can be clamped to and unclamped from said adapter ring independently of said second flange and so that said bolts can be removed from said first flange and adapter ring independent of said second flange; and f) said second clamping means comprising:
   i) a second plurality of threaded bolts extended through said second flanged pipe section end and threaded into the threaded bolt holes of said outer set of bolt holes in said adapter ring for clamping only the inner side of said second flange to said second side of said adapter ring with said second seal means therebetween, so that a fluid seal is effected by said second seal means being contacted by and compressed between the inner side of said second flange and the second side of said adapter ring;
   ii) each of said bolts having bolt heads with said bolts being oriented with their heads adjacent the outer side of said second flange so that said second flange can be clamped to and unclamped from said adapter ring independently of said first flange and so that said bolts can be removed from said second flange and adapter ring independent of said first flange.

2. A pipe adapter flange joint for joining two flanged pipe section ends together so that internal fluid passages in said flanged pipe section ends may be joined in fluid communication with one another which comprises:

a) a first flanged pipe section end having a first flange that is associated with an outer diameter-controlled pipe section fabricated of plastic material that is selected from the group comprising high-density polyethylene plastic and other material that is specified by its outer diameter; a second flanged pipe section end having a second flange that is associated with an inner diameter-controlled pipe section fabricated of material that is selected from the group comprising ductile iron, steel and PVC plastic and that is specified by its inner diameter such that for a given pipe capacity said first pipe section has a larger outer diameter than said second pipe section;

b) an adapter ring comprising a disk having first and second sides and being positioned between opposing inner sides of said first and second flanges of said flanged pipe section ends so that a transverse axis of said adapter ring is generally coincident with a longitudinal axis that extends through said flanged pipe section ends, said adapter ring having:
   i) an aperture through said disk in fluid communication with the fluid passages in said flanged pipe section ends, and
   ii) a first outer set of bolt holes extending through said disk, and
   iii) a second inner set of bolt holes extending through said disk, said second inner set of bolt holes being threaded and located radially inward of said first set of bolt holes relative to said transverse axis;

c) first clamping means for clamping only said first flanged pipe section end to said adapter ring; second clamping means for clamping only said second flanged pipe section end to said adapter ring;

d) first seal means positioned between said first flange of said first flanged pipe section end and said adapter ring to effect a fluid seal therebetween; and second seal means positioned between said second flange of said second flanged pipe section end and said adapter ring to effect a fluid seal therebetween;

e) said first clamping means comprising:
   i) a compression ring having outer and inner sides, the inner side of said compression ring being constructed to bear against an outer side of said first flange, and
   ii) a first plurality of bolts extended through said compression ring and into the bolt holes of said first outer set of bolt holes in said adapter ring, said bolts being cooperatively constructed and arranged with respect to said adapter ring for clamping only the inner side of said first flange to said first side of said adapter ring with said first seal means therebetween, so that a fluid seal is effected by said first seal means being contacted by and compressed between the inner side of said first flange and the first side of said adapter ring;
   iii) each of said bolts having bolt heads with said bolts being oriented with their heads adjacent the outer side of said compression ring so that said first flange can be clamped to and unclamped from said adapter ring independently of said second flange and so that said bolts can be removed from said first flange and adapter ring independent of said second flange; and f) said second clamping means comprising:
   i) a second plurality of threaded bolts extended through said second flanged pipe section end and threaded into the threaded bolt holes of said outer set of bolt holes in said adapter ring for clamping only the inner side of said second flange to said second side of said adapter ring with said second seal means therebetween, so that a fluid seal is effected by said second seal means being contacted by and compressed between the inner side of said second flange and the second side of said adapter ring;
   ii) each of said bolts having bolt heads with said bolts being oriented with their heads adjacent the outer side of said second flange so that said second flange can be clamped to and unclamped from said adapter ring independently of said first flange and so that said bolts can be removed from said second flange and adapter ring independent of said first flange.

* * * * *